(12) United States Patent
Bhatia et al.

(10) Patent No.: US 11,457,026 B2
(45) Date of Patent: Sep. 27, 2022

(54) SYSTEMS AND METHODS FOR SECURING INDUSTRIAL NETWORKS

(71) Applicants: Randeep Bhatia, Green Brook, NJ (US); Bhawna Gupta, Saratoga, CA (US); Steven Benno, Towaco, NJ (US); Jairo Esteban, Freehold, NJ (US); T. V. Lakshman, Morganville, NJ (US)

(72) Inventors: Randeep Bhatia, Green Brook, NJ (US); Bhawna Gupta, Saratoga, CA (US); Steven Benno, Towaco, NJ (US); Jairo Esteban, Freehold, NJ (US); T. V. Lakshman, Morganville, NJ (US)

(*) Notice: Subject to any disclaimer, the term of this patent is extended or adjusted under 35 U.S.C. 154(b) by 445 days.

(21) Appl. No.: 16/578,535

(22) Filed: Sep. 23, 2019

(65) Prior Publication Data

US 2021/0092132 A1 Mar. 25, 2021

(51) Int. Cl.
*H04L 9/40* (2022.01)
*G06K 9/62* (2022.01)
*G06F 9/455* (2018.01)
*G06N 20/00* (2019.01)

(52) U.S. Cl.
CPC ...... *H04L 63/1416* (2013.01); *G06F 9/45558* (2013.01); *G06K 9/6256* (2013.01); *G06N 20/00* (2019.01); *H04L 63/1425* (2013.01); *H04L 63/1433* (2013.01); *H04L 63/1458* (2013.01); *H04L 63/1466* (2013.01); *H04L 63/20* (2013.01); *G06F 2009/45587* (2013.01); *G06F 2009/45595* (2013.01)

(58) Field of Classification Search
CPC ............. H04L 63/1416; H04L 63/1425; H04L 63/1433; H04L 63/1466; H04L 63/1458; H04L 63/20; G06F 9/45558; G06F 2009/45587; G06F 2009/45595; G06K 9/6256; G06K 9/00536; G06K 9/00523; G06N 20/00; G06N 20/10; G06N 3/0454; G06N 3/088
USPC .......................................................... 726/23
See application file for complete search history.

(56) References Cited

U.S. PATENT DOCUMENTS

| | | | |
|---|---|---|---|
| 9,288,220 B2 * | 3/2016 | Raugas | H04L 63/145 |
| 10,645,109 B1 * | 5/2020 | Lin | G06N 5/047 |
| 11,126,173 B2 * | 9/2021 | Cella | G06N 3/049 |
| 2015/0128263 A1 * | 5/2015 | Raugas | H04L 63/1433 726/23 |
| 2016/0330225 A1 * | 11/2016 | Kroyzer | H04L 63/1425 |
| 2017/0169357 A1 * | 6/2017 | Caspi | H04L 43/062 |
| 2018/0165554 A1 * | 6/2018 | Zhang | G06N 3/084 |
| 2018/0204111 A1 * | 7/2018 | Zadeh | G06N 3/0436 |
| 2019/0121350 A1 * | 4/2019 | Cella | G05B 19/41865 |
| 2019/0188065 A1 * | 6/2019 | Anghel | G06F 11/0778 |
| 2019/0312898 A1 * | 10/2019 | Verma | H04L 63/1416 |
| 2019/0324444 A1 * | 10/2019 | Cella | G06N 3/0436 |
| 2020/0112571 A1 * | 4/2020 | Koral | G06N 3/08 |
| 2020/0364579 A1 * | 11/2020 | Misu | G06N 3/0445 |

(Continued)

FOREIGN PATENT DOCUMENTS

WO WO-2018224670 A1 * 12/2018 .......... G06K 9/6218

*Primary Examiner* — Badri Champakesan
(74) *Attorney, Agent, or Firm* — Capitol Patent & Trademark Law Firm, PLLC

(57) ABSTRACT

Network-based, unsupervised classifiers are provided. The classifiers identify both known and unknown attacks aimed at industrial networks without the need to have a priori knowledge of known malicious attack patterns.

17 Claims, 6 Drawing Sheets

(56) References Cited

U.S. PATENT DOCUMENTS

2020/0380531 A1* 12/2020 Vaidya ............... G06Q 30/0185
2020/0410322 A1* 12/2020 Naphade ................ G06N 7/005

* cited by examiner

Algorithm 1 PCA-based reconstruction

1. procedure PCA_Reconstruction( pca, x )
2.     x' = pca.transform( x )
3.     y = pca.inverse_transform( x' )
4.     return y
5. end procedure

Figure 6

SYSTEMS AND METHODS FOR SECURING INDUSTRIAL NETWORKS

This section introduces aspects that may be helpful to facilitate a better understanding of the described invention (s). Accordingly, the statements in this section are to be read in this light and are not to be understood as admissions about what is, or what is not, in the prior art.

We are at the cusp of a $21^{st}$ century industrial revolution. Often termed Industry 4.0, it is the future of industrial production based on the Internet of Things ("IoT"). With greater control of physical devices, machines, production processes, and supply chain, IoT promises to usher in a new era of unprecedented levels of automation and productivity. However, along with the promises come increased challenges in protecting the many key devices and processes from electronic threats and security risks. The many connected, yet electronically unsecured, devices within an industrial network makes such devices and their respective processes vulnerable to electronic and telecommunication attacks that can have dire consequences ranging from shutting or slowing down production systems, causing accidents, and sabotaging nuclear reactors, oil rigs and electric grids.

There has been a rapid increase in the number and severity of attacks involving connected devices. For example, in 2016 a series of highly effective distributed, denial-of-service (DDoS) attacks were launched via the Mirai malware. One such attack, which harnessed as many as 100,000 insufficiently secured devices (e.g., cameras, digital video recording players and other IoT devices), turned the devices into "botnets" which launched an attack at an unprecedented rate of 1 Tbps aimed at some of the Internet's domain name system (DNS) infrastructure thereby crippling many popular websites for the better part of a day. The subsequent release of the Mirai source code has resulted in numerous additional IoT attacks.

Accordingly, the inventors believe that existing industrial security measures are inadequate and, therefore, require new solutions.

Some have suggested the use of existing techniques that rely on knowledge of known attacks to protect industrial networks. Such known attacks typically have predefined electronic or telecommunication patterns (called "signatures") or models that can replicated. To do so requires "training" the systems and processes that need to be protected to recognize these known patterns. However, while such existing techniques may protect industrial networks, systems and processes against known attacks, they are ill-suited to protect against new and unknown attacks that have unknown or hard to detect patterns that the techniques have not been "trained" (i.e., programmed) to recognize.

Accordingly, it is desirable to provide systems, devices and related methods that provide protection for systems and processes within industrial networks that overcome the shortfalls of existing techniques.

SUMMARY

The inventors disclose various systems, devices and related methods that may be used to protect industrial systems, devices and processes within industrial networks from electronic and telecommunication-based attacks. The inventors describe exemplary embodiments where attacks can be detected without the need to rely upon knowledge of known attack patterns, for example.

For various reasons, the inventors believe that the operation of, and signals exchanged by, elements of an industrial network are predictable. For instance, electronic signals involved in many industrial safety and mission-critical applications are typically controlled to a great extent in order to ensure that there are no errors in the data reported to a central controller (e.g., from different sensors). Errors can lead to severe consequences, such as when they cause a robotic arm to over-reach and damage property or people.

In accordance with embodiments of the invention described herein, the predictability of systems, devices and processes within an industrial network can be used to create unique solutions for detecting anomalies that in turn may be used to detect unknown or new electronic or telecommunication based attacks (hereafter simply "attacks"). Thus, unlike existing techniques, there is no need to rely upon knowledge of known attacks or known security flaws. The inventors further recognized that, to be reliable, any new technique must also address "false positives" (i.e., classifying a non-attack as an attack) due to, for example, short term fluctuations as well as long term changes to an industrial network. Accordingly, exemplary embodiments of the invention described herein incorporate features that are regularly updated to avoid such false positives.

In embodiments of the invention, inventive network-based machine learning (ML) approaches for attack detection are described. These embodiments comprise one or more processors that may be programmed to execute instructions stored in electronic memory to, among other things, complete inventive functions methods and features such as the generation of electronically stored models of normal industrial network behavior.

More particularly, the processors may be operable to execute stored instructions that complete computations based on normal industrial network traffic patterns (i.e., patterns of data and signals received at, or by, elements of an industrial network, system, device or process) and use the results of the computations to predict new attacks (as well as known attacks) based on anomalies detected from the computations. The computations may compare, for example, presently received industrial network traffic patterns to previously received, historical normal, industrial network traffic patterns to determine whether the received traffic may be a malicious attack. In embodiment, the instructions may comprise what is known as a ML classifier. Because the inventive techniques do not need to rely upon a comparison of received traffic with known malicious attack patterns to detect attacks, the inventive techniques may be referred to as "unsupervised" techniques.

Some specific embodiments are directed at the following: (1) An unsupervised method for the continuous, real-time detection of abnormal traffic in an industrial network comprising: collecting data from endpoints of the industrial network; grouping the collected data into sets of data, each set representing data that is grouped into a set during an adjustable time period before the time period expires; aggregating and mapping the data that is within each set to a single multi-dimensional point value; extracting the most relevant data features from each multi-dimensional point values by executing a machine learning process that computes a lower dimensional representation of the collected data; identifying each set of extracted data in real-time as normal or abnormal once the data has been grouped into groups of data by determining whether a real-time reconstruction error (RE) value is below or above a RE threshold value, the RE threshold value based on a previously computed error between what is output by the machine learning process for a given input based on data previously collected during normal operation of the industrial network; determining the number of sets of data within an adjustable, attack detection time period (hereafter "window") that have been so-identified as abnormal among all time periods within the window; computing a percentage based on the number of identified abnormal sets of data within the window divided by the total number of normal and abnormal sets of data within the window, and declaring the data, within the abnormal sets within the window, attack data when the computed percentage is greater than a threshold percentage.

The threshold percentage for such a method may be 50%, and the adjustable time period may be ten seconds, for example.

The RE threshold for such a method may be computed as a value for which 90% of the data within a previous training set of data has lower real-time RE value and the remaining data in the training set has higher RE values.

For the method described above an attack may be declared when a plurality of consecutive adjustable time periods are classified attack time periods.

In an embodiment, a machine learning process may comprise an autoencoding process or principle component analysis process.

In a further embodiment, data may be collected from collection means configured and connected close to an end point of the network and/or by executing packet capture process or virtual machine/container (e.g. tcpdump).

A second exemplary method may be directed an unsupervised method for detecting the source of an attack in an industrial network comprising: collecting data from one or more endpoints of the industrial network that are suspected of being sources of an attack; electronically filter out data that originates from sources that are not directed at a target; generating a RE value based on data from sources that are directing data at the target during the attack; comparing the generated RE value to a previously computed RE threshold associated with the target based on non-attack traffic patterns; declaring one or more of the sources to be a source of the attack when the generated RE value exceeds the RE threshold.

In the method just described a Machine Learning model training may be repeated periodically and computing the RE threshold may also be repeated periodically using data collected since the last time training was performed.

In addition to the exemplary methods just described, the inventors provide inventive controllers for completely the functions and features described herein. On such controller may be operable to control an unsupervised, continuous, real-time detection of abnormal traffic in an industrial network by: collecting data from endpoints of the industrial network; grouping the collected data into sets of data, each set representing data that is grouped into a set during an adjustable time period before the time period expires; aggregating and mapping the data that is within each set to a single multi-dimensional point value; extracting the most relevant data features from each multi-dimensional point values by executing a machine learning process that computes a lower dimensional representation of the collected data; identifying each set of extracted data in real-time as normal or abnormal once the data has been grouped into groups of data by determining whether a real-time reconstruction error (RE) value is below or above a RE threshold value, the RE threshold value based on a previously computed error between what is output by the machine learning process (e.g., autoencoding process or principle component analysis process) for a given input based on data previously collected during normal operation of the industrial network; determining the number of sets of data within an adjustable, attack detection time period (hereafter "window") that have been so-identified as abnormal among all time periods within the window; computing a percentage based on the number of identified abnormal sets of data within the window divided by the total number of normal and abnormal sets of data within the window, and declaring the data, within the abnormal sets within the window, attack data when the computed percentage is greater than a threshold percentage.

Similarly, threshold percentage may be 50% and the RE threshold may be computed as a value for which 90% of the data within a previous training set of data has lower real-time RE value and the remaining data in the training set has higher RE values.

In an additional embodiment, the controller may be operable to declare an attack when a plurality of consecutive adjustable time periods are classified attack time periods.

Further, the controller may be operable to collect data from collection means configured and connected close to an end point of the network and/or by executing packet capture process or virtual machine/container (e.g., tcpdump).

A third exemplary embodiment is directed at a controller that is operable to detect the source of an attack in an industrial network by, for example, collecting data from one or more endpoints of the industrial network that are suspected of being sources of an attack; electronically filter out data that originates from sources that are not directed at a target; generating a RE value based on data from sources that are directing data at the target during the attack; comparing the generated RE value to a previously computed RE threshold associated with the target based on non-attack traffic patterns; and declaring one or more of the sources to be a source of the attack when the generated RE value exceeds the RE threshold.

Further, such a controller may be operable to repeatedly and periodically complete a Machine Learning model training and where computing the RE threshold is repeated periodically using data collected since the last time the training was performed.

The inventive, unsupervised techniques are believed to be easier to implement than "supervised" techniques that require knowledge of known, malicious attack patterns because it is often very difficult to capture and replicate a complete, malicious attack pattern (i.e., those who have been attacked are reluctant to share the pattern and/or it is difficult to determine when the pattern actually began, for example) while it is fairly straightforward to acquire normal network traffic patterns of a system, device or process within an industrial network.

DESCRIPTION OF THE DRAWINGS

FIG. 6 depicts exemplary pseudo-code for implementing a PCA function according to an embodiment of the invention.

DETAILED DESCRIPTION, WITH EXAMPLES

Figure 1:
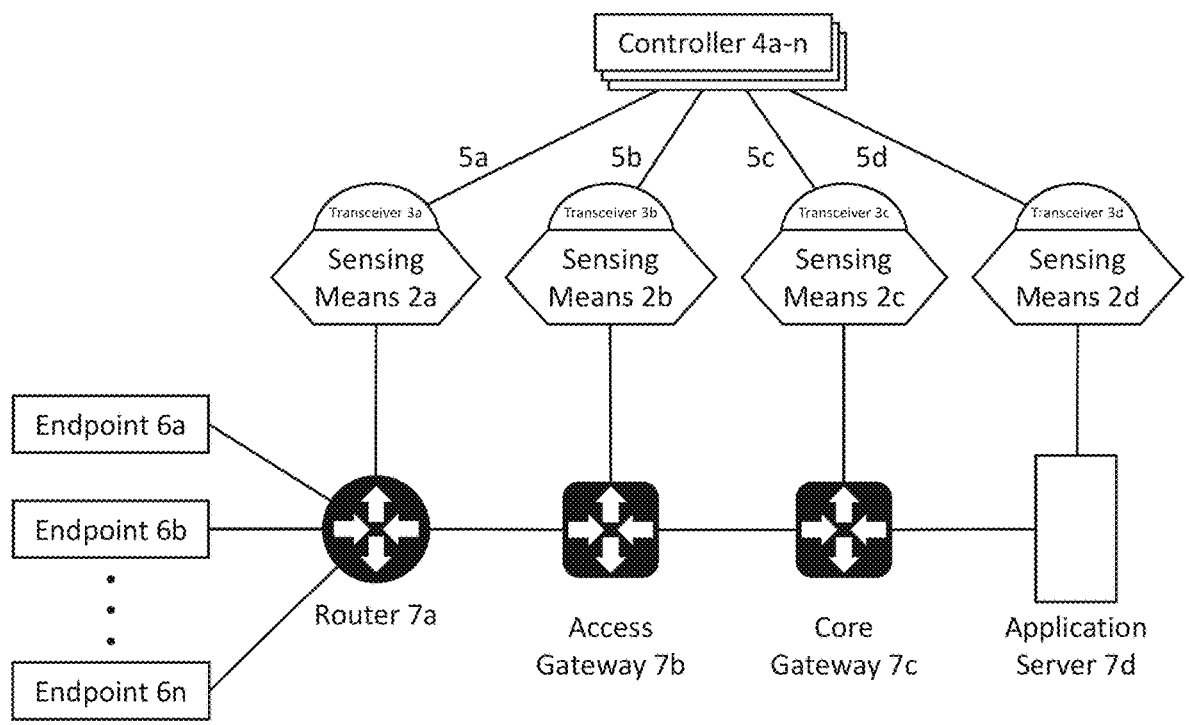
FIG. 1 depicts a simplified block diagram of an exemplary industrial network according an embodiment of the invention.

Exemplary embodiments of systems, devices and related methods for securing industrial networks are described herein and are shown by way of example in the drawings. Throughout the following description and drawings, like reference numbers/characters refer to like elements.

It should be understood that although specific embodiments are discussed herein, the scope of the disclosure is not limited to such embodiments. On the contrary, it should be understood that the embodiments discussed herein are for illustrative purposes, and that modified and alternative embodiments that otherwise fall within the scope of the disclosure are contemplated.

It should also be noted that one or more exemplary embodiments may be described as a process or method (the words "method" or "methodology" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art.

As used herein, the term "and/or" includes any and all combinations of one or more of the associated listed items. As used herein, the singular forms "a," "an" and "the" are intended to include the plural form, unless the context and/or common sense indicates otherwise.

It should be understood that when an system or device, or a component or element of a system or device, is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures for the sake of clarity.

As used herein the term "operable to" means "functions to" unless the context, common sense or knowledge of one skilled in the art indicates otherwise.

It should be understood that the phrase "central controller(s)" means one or more electronic processors that are operable to retrieve and execute instructions stored as electronic signals in electronic memory, where a set of such stored instructions may constitute steps in an inventive process or application, or may be executed to complete an inventive function(s) such as identifying, classifying, collecting, autoencoding, principal component analyzing, extracting, detecting, determining, estimating, processing, receiving, reconstructing, transmitting, transceiving, generating, scheduling, initiating, computing, comparing, and storing (and tenses of the aforementioned functions) to name just a few inventive functions that may be completed by executing such stored electronic instructions. Further, it should be understood that each embodiment of a central controller described herein is further configured with the necessary hardware and firmware components to enable each to process signals, data and/or content (collectively "data") much faster than humanly possible and to receive, transmit and exchange data much faster than humanly possible. Each of the embodiments of the present invention cannot practically be implemented in any amount of time that would be acceptable to one skilled in the art using human beings as substitutes for the systems and devices described herein. For example, the embodiments described herein involve methods that secure industrial networks against malicious attacks. Accordingly, the use of humans as substitutes for such methodologies is contrary to the objectives of the invention and does not result in the improvements provided by the invention because, for example, the inventive methodologies process data many times faster than the human mind (within the time periods demanded by users of embodiments of the present invention and those skilled in the art of the present invention).

As used herein, the term "embodiment" or "exemplary" mean an example that falls within the scope of the invention(s).

As used herein the word "attack" means an electronic and/or telecommunication attack aimed at an industrial network that contains an industrial system, device or process. One example of such an attack is the Mirai malware described previously.

As used herein the phrase "industrial network" means a network that is located in an industrial facility (e.g., a manufacturing facility, chemical processing plant) and is used to connect and/or control one or more elements of industrial system (e.g., equipment), device and/or industrial process. The network typically uses protocols that provide deterministic, real-time control over systems, devices and processes.

In embodiments of the invention, the inventive controller may be operable to compute a model of an industrial network, using ML algorithms, based on network-specific data patterns that are representative of normal operation and behavior of the equipment, processes and communications within such an industrial network, store such a model electronically, and then use such a model to identify unknown (and known) potential malicious attacks launched against the same or similar industrial network. Examples of such ML algorithms include, but are not limited to, autoencoding and principle component analysis (PCA), which are described herein.

As used herein the term "autoencoding function" or "autoencoding" means a function or functions completed by one or more processors programmed using stored instructions to function as one or more "artificial" neural networks. In particular the processors may execute instructions that complete backpropagation functions in order to recreate input data with minimal error. An exemplary autoencoding function may comprise three functional layers: an input data layer, encoding layer and decoding layer. The encoding layer functions to compress input data into a latent-space representation whose dimensions are usually smaller than the input data's feature set. The decoding layer functions to reconstruct the data that was input from the latent-space representation. The computed distance (i.e., value, difference in value) between the value of the data input and the value of the reconstructed data may be defined by a loss function that indicates the proximity of a particular data input value to a predicted value governed by a model.

Autoencoding functions may be incorporated into an inventive system (e.g., central controller) or process described herein. Such a function may generate a model of an industrial network based on network-specific data patterns that are representative of normal operation and behavior of the equipment, processes and communications within such an industrial network, store such a model electronically, and then use such a model to identify unknown (and known) potential malicious attacks launched against the same or similar industrial network.

Where used herein the phrase "Principal Component Analysis" (PCA) means a function or functions completed by one or more processors programmed using stored instructions (the processors may be the same as those used to implement autoencoding functions, or may be different) to generate linear, statistical analogues of autoencoding. To implement PCA functions, an electronic processor (or processors) may input original data (points) and then generate a linear projection of such inputted data (i.e., data points) to a low-dimensional subspace (i.e., to "projected" data points) that minimizes the error between the original and projected data (points). This subspace comprises a model of input data. Said another way, the error(s) (values) between the original, inputted data (points) and projected data (points) may be used to indicate the proximity of a set of input data points to a set of expected, normal data (where the normal data may initially comprise "training data"). As described in more detail elsewhere herein, a high error may indicate a deviation of an input data (point) from an expected, normal data (point) and, therefore, may be used in the inventive techniques described herein as an indicator of anomalous (and malicious) attacks (i.e., attack data).

In embodiments of the invention, an inventive controller may be operable to complete PCA functions, including, but not limited to: (i) computing the principal components from an original input data set and calculating the total variance of the components by summing the sample variance of each of the components, (ii) selecting the smallest number of k components, where k is the number of identified principal components in the training data such that the cumulative variance of the top k-components exceed a given percentage (for instance, 95%) of the total variance, and then (iii) restricting the PCA function to use only the top k principal components in encoding/decoding computations. Accordingly, an inventive PCA function may output a pattern of data that is substantially the same as the original, inputted pattern of data by first transforming each input data point x to its lowest dimensional counterpart x'. Next, an inverse mapping of the lowest dimensional point x' to a point y in an original coordinate space (of point x) is completed. As described further elsewhere herein, the PCA function then is operable to generate a reconstruction error value, abbreviated "RE" for each multi-dimensional data point x using the process E=f(x,y), where E is an RE value and f(x,y) is a function that computes the "difference" between two data points x and y. Euclidian distance between x and y may be an exemplary function f(x,y). As set forth in more detail herein, the inventors provide exemplary pseudo-code for implementing the PCA function in FIG. 6.

Referring now to FIG. 1 there is depicted a simplified block diagram of an exemplary industrial network 1. As depicted the network 1 may comprise a plurality of collection means 2a to 2n (where "n" indicates a last collection means) for detecting, collecting and/or measuring (collectively "collecting") raw data associated with either a parameter of an element of the network 1, some element or end point 6a to 6n (where "n" is the last endpoint) in the network 1 (collectively "end point", e.g., electrical motor, robotic equipment), the operation of some end point 6a to 6n of the network 1 or a process that is a part of the network 1. A non-limiting example of collection means 2a to 2n is an electronic processor that is operable to receive data from one or more elements of network 1.

As depicted in the embodiment of the invention shown in FIG. 1, the collection means may comprise one or more devices that are configured and/or connected to an end point 6a-6n by, for example, tapping into a port of a router and/or switch 7a to 7n (where "n" is a last router/switch) that is communicatively connected to a respective end point 6a to 6n. Alternatively, the collection means may comprise a device (hardware gateway, server) that is operable to execute a stored, packet capture process or virtual machine/container.

It should be understood that the above types of collection means are only a few of the many types of collection means that may be found in an industrial network 1. Further, the inventive techniques for detecting and preventing malicious attacks on industrial networks, such as network 1, are not limited to the types of exemplary collection means set forth above.

Network 1 also comprises one or more transceivers 3a to 3n (collectively, "transceivers") that may be operable to receive electrical signals representing the raw data collected by the collection means 2a to 2n and then transmit the electrical signals to one or more central controllers 4a to 4n via communication channels 5a to 5n, for example, after appropriately formatting the signals for transmission. In embodiments of the invention, the channels 5a to 5n may comprise wireless telecommunication channels or wired conductors (collectively "channels") that are part of a telecommunications network infrastructure, e.g., telecommunications network infrastructure).

Further, each transceiver 3a to 3n may be further operable to receive instructions in the form of electrical signals from the one or more central controllers 4a to 4n via the same (or different) communication channels 5a to 5n, where the instructions may thereafter be further transmitted by the transceivers 3a to 3n to a sensing means 2a to 2n. Upon being received at the collection means 2a to 2n the instructions may control the operation of the collection means 2a to 2n, or request further information from the collection means 2a to 2n, to name just two exemplary uses of the instructions.

We now turn to a discussion of the central controllers 4a to 4n. Initially, it should be understood that although a number of controllers are shown in FIG. 1, this is merely exemplary. In fact, sometimes only a single controller may be required. Other times, a plurality are required depending, for example, on the type of data that may be collected and sent to the controllers 4a to 4n and/or the amount of data that a may be collected and sent. It should be further understood that a separate PCA or autoencoding function may be devoted to each selected target of an attack. Accordingly, each of the controllers 4a to 4n may be operable to complete PCA or autoencoding functionality for one or a plurality of targets (e.g., on controller may complete the PCA or autoencoding functions for all targets).

In embodiments of the invention, one or more of the inventive central controllers 4a to 4n may be operable to retrieve instructions from stored memory and execute those instructions to, among other things, complete unsupervised autoencoding and PCA functions to extract the most relevant data associated with end-points 6a-6n of the industrial network 1, for example, and further detect unknown (and known) malicious attacks based on data/signals received from collection means 2a-2n, for example, as set forth in more detail herein.

Backtracking somewhat, before central controllers 4a to 4n are deployed within an actual industrial network, such as network 1, the controllers must complete what is typically referred to as a "training" time period. During such a training period, the one or more inventive central controllers 4a to 4n may be operable to receive data that is representative of normal traffic (data) between end points 6a to 6n of network 1 from collection means 2a to 2n, for example. That is to say, even though the one or more controllers 4a to 4n are not yet deployed within network 1, the inventors were able to generate data representative of normal network traffic and then input such data into the one or more controllers 4a to 4n to train (i.e., program) the controllers. Such data is typically referred to as "training data". In an embodiment, one goal of such a training time period is to adjust the stored, autoencoding and PCA functions (e.g. adjust the electronic signals stored in electronic memory designed to complete the autoencoding and PCA functions) stored within one or more of the controllers 4a to 4n using the representative training data and compute a classification threshold to achieve a desired reconstruction error percentile (e.g. 90 percentile) that may be used to further classify data as attack data or non-attack data that is explained in further detail below. As so trained, controllers 4a to 4n may, thereafter, be operable to reliably extract the most relevant data associated with end-points 6a-6n of the industrial network 1 in order to, thereafter, detect normal industrial network traffic. Such a capability is required later on when the controllers are deployed in the network 1 to avoid mis-identifying normal traffic as abnormal traffic. Said another way, before an inventive controller 4a to 4n is deployed such a controller must operate to correctly identify normal industrial network traffic patterns.

In more detail, in one embodiment such training data may be generated by configuring a simulated, large, local area industrial IoT network that represents a network, such as network 1 (or, any desired network). Such a representative network may comprise "virtual" end points (e.g., simulated end points that function similar to actual end points) and switches as well as physical sensors and local, industrial controllers. Once configured, data may be collected from such a representative network during the normal operation of the virtual end points, switches, sensors and controllers. Further, attacks may then be generated from the virtual end points to simulate an actual attack. The type and intensity of attacks can be controlled by various software tools and scripts, for example.

In embodiments of the invention, the data collected during normal operation of the representative network may be stored in memory (e.g., hardware memory, database) and used as training data to train one or more central controllers 4a to 4n to detect actual abnormal traffic patterns (and actual normal traffic patterns as well). The data can also be used to adjust (re-train) a model for which training was already performed. It should be understood that the inventive central controllers may be operable to be trained using data that is collected during normal operation of a plurality of different networks, and not just the exemplary network 1. That is to say, once a representative network is configured that represents an actual network, data may be collected during normal operation of such a representative network and then be used as training data to train one or more of the inventive central controllers 4a to 4n to detect both actual normal and abnormal data or data patterns in real-time. In embodiments, collection means (e.g., one or more devices) may be configured and connected close to an end point 6a-6n by, for example, tapping into a port of a router and/or switch 7a to 7n (where "n" is a last router/switch, e.g. using port mirroring) that is communicatively connected to a respective end point 6a to 6n or by directly tapping the network interface cards on the end-points. Alternatively, the collection means may comprise a device (hardware gateway, server) that is operable to execute a stored, packet capture process or virtual machine/container (e.g., tcpdump).

The inventors believe that the use of representative, normal network traffic to train the inventive central controllers 4a to 4n to extract the most relevant data associated with end-points 6a-6n of the industrial network 1 (i.e., adjust the autoencoding and PCA functions stored in each controller 4a to 4n) and detect abnormal data patterns—as opposed to the use of known malicious data patterns as training data—is unique and simplifies the implementation of the inventive controllers 4a-4n in order to secure industrial networks against malicious attacks.

As described further herein, it should be understood that once normal traffic patterns associated with a simulated, specific industrial network has been collected and stored, the present invention uses such data to train actual, inventive systems and devices (e.g., controllers 4a to 4n) to detect abnormal traffic patterns.

In embodiments of the invention, upon receiving data from collection means 2a-2n (or more directly from end points 6a to n) the one or more central controllers 4a to 4n may be operable to first group the received data into sets, and then process each set of data to determine whether a given set of data represents normal or abnormal data.

In more detail, the one or more central controllers 4a to 4n may be operable to retrieve stored instructions from memory in order to complete the function of grouping the input data into sets of data. For example, the instructions may direct the one or more controllers 4a to 4n to set an adjustable time period or "epoch" (adjustable epoch or just "epoch" for short) and group (store) any input data that is received by the one or more controllers 4a to 4n during such an epoch into a first set of data before the epoch expires. Thereafter, this process may be repeated to create additional sets of data, each set representing data that is received by the one or more controllers 4a to 4n during such an epoch before the epoch expires. In an embodiment, this process may be continually repeated as long as additional data is being input into the one or more controllers 4a to 4n.

At the end of each epoch, the set of collected data is input to one or more controllers 4a to 4n which may be further operable to retrieve stored instructions from memory in order to complete the function of classifying each set of data as normal or abnormal data. In embodiments, classification may be completed in real-time once the data for an epoch or epochs is ready and available.

In one embodiment, classification may comprise first completing the functions of aggregating and mapping the data that is within each set to a single multi-dimensional point (value) and then storing each multi-dimensional point. The "dimensions" of each point represent the different features of the data within each set of data (e.g., different protocols, flow specific statistics). Once each multi-dimensional point has been stored then the one or more controllers 4a to 4n may be operable to extract the most relevant data (i.e., features) from the multi-dimensional points associated with end-points 6a-6n of the industrial network 1 by executing stored instructions that comprise the autoencoding and PCA function/processes, for example.

Figure 2A:
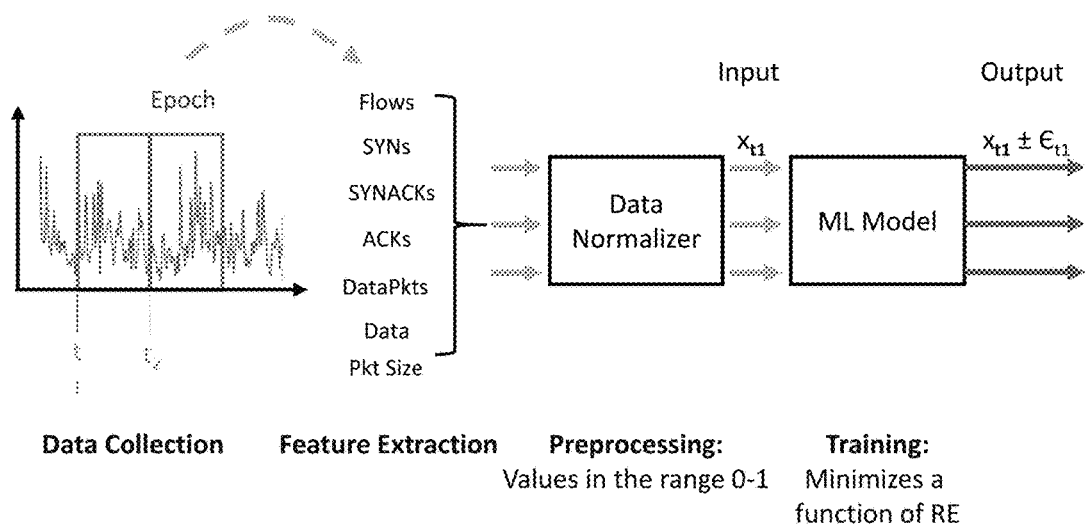
FIGS. 2a and 2b depict exemplary illustrations of the collection of network data traffic patterns and computation of a reconstruction error threshold and using it to build an epoch classifier according to embodiments of the invention.

Some exemplary features that may be present in (and may be extracted from) input data are shown in FIG. 2a. The features represented by a multi-dimensional point may be specific to a single network end point, network protocol, or may be more general. For example, the number of SYN packets and the number of ACK packets are features specific to the TCP/IP protocol. However, features that are more general and that apply to many different network protocols may also be represented by a multi-dimensional point. One such feature is Average Packet size. Besides protocol specific features, other features such as flow-specific features (e.g., the number of distinct flows active during an epoch) may be represented. Thus, a wide variety of industrial network-specific features may be represented by a multi-dimensional point. It should be understood that it is practically impossible to list all of the features of the end points of a specific industrial network that may be represented by a multi-dimensional point. Suffice it to say that the features that may be represented by a multi-dimensional point are unique to an end point of a specific network. Accordingly, the inventive embodiments described herein describe systems and devices (e.g., central controllers) that may detect such network-specific features and then aggregate and map data associated with such network-specific features to generate multi-dimensional points (value(s)) and then generate such multi-dimensional points. The ability to generate multi-dimensional points based on features that are specific to a given end-point or end-points $6a$ to $6n$ of an industrial network in turn allows the autoencoding and PCA functions to create a model of normal data associated with such end-points (i.e., adjust the autoencoding and PCA functions stored in each controller $4a$ to $4n$) which can efficiently detect abnormal data patterns since they do not match the model. In sum, the inventive controllers and related methods provide the ability to adjust the autoencoding and PCA functions to the features of a specific industrial network.

Because normal traffic in industrial networks contains superfluous or redundant features, ML algorithms such as autoencoders and PCA are well suited for computing a lower dimensional representation of the normal traffic data, which is necessary for separating it from abnormal traffic.

Continuing, once the multi-dimensional points have been generated based on an epoch (time period) controllers provided by the present invention (e.g., $4a$ to $4n$) then may store each point as a reference point.

Additional steps and/or functionality may then be completed by the inventive controllers $4a$ to $4n$ in order to identify/classify data as normal or abnormal. That is to say the generation of the multi-dimensional points is just one step in determining whether the data received from end points $6a$ to $6n$ is normal or abnormal. At this point, multi-dimensional points have been generated and stored or made available for online processing. Accordingly, in one embodiment once the points are available, classification of such points (data) as attack or non-attack data may be completed.

As indicated above, in an embodiment of the invention the controllers $4a$ to $4n$, for example, may be operable to identify normal or abnormal data on an epoch-by-epoch basis. That is to say the inventive controllers $4a$ to $4n$ may be operable to execute instructions stored in memory to analyze data (e.g., real-time, collected multi-dimensional points or stored points) within each epoch (i.e., time-period) and then identify whether such data is normal or abnormal for each epoch by first completing inventive autoencoding and PCA functions (see FIGS. $2a$ and $2b$).

Thereafter, each controller $4a$ to $4n$ may be operable to compute a classification threshold in order classify the collected data points as attack or non-attack data. In an embodiment, this classification threshold may be referred to herein as a "reconstruction error" (RE) threshold. Such a RE threshold may initially be determined for a given industrial network during a training time period. Thereafter, the so-determined RE threshold may be used by actual controllers $4a$ to $4n$ to distinguish between actual normal and abnormal data as described herein.

For example, and as set forth in more detail elsewhere herein, controllers $4a$ to $4n$ may be operable to continuously classify or identify sets of input data as normal or attack based on whether a real-time RE value is below or above a computed RE threshold value (see FIG. $2b$). In an embodiment, the controllers $4a$ to $4n$ may be operable to identify a set of input data as normal if a given percentage (a non-limiting example is 90%) of the data within the set have lower RE values than a threshold RE value and the remaining data (a non-limiting example is 10%) have higher RE values than the threshold. In embodiments, these percentages can be provisioned or learned and adjusted during the training period.

In yet another embodiment, it should be understood that an RE threshold may continually be adjusted by controllers $4a$ to $4n$ based on changes to the features of end points of an actual industrial network.

An RE may be used as an indicator that measures the error between what is output (y) by the autoencoding and PCA functions for a given input (x). In an embodiment, an inventive RE may be computed based on the result of evaluating a function $f(x, y)$. Examples of such function include the norm of the difference vector y−x and the 2-norm/Euclidian distance. For instance, with the function one norm and for one-dimensional points x and y, RE is the absolute value |y−x|. In FIG. $2a$, for epoch t1 the model has RE $\in_{t1}>0$ on a one-dimensional input $x_{t1}$ for which the output is either $x_{t1}+\in_{t1}$ or $x_{t1}-\in_{t1}$. Because the data we are analysing is multi-dimensional, the square of the 2-norm may be used to compute an RE (i.e., the square of the (Euclidian) distance between the n-multi-dimensional points y and x. That is, RE may be defined as $\|E\|^2$ (here E=y−x) where:

$$\|E\|^2 = \Sigma_{i=1}^n \in_i^2$$

In embodiments, during a training period, the inventive autoencoding and PCA functions may be configured to minimize the average RE on an input set of multi-dimensional data in order to learn patterns present in training data. This also allows the inventive autoencoding and PCA functions to accurately reconstruct other test data that is similar to the training data.

In an embodiment of the invention, the inventive autoencoding and PCA functions may be configured (i.e., a processor executes stored instructions to complete a process) to correlate anomalous data patterns that are not present in the training data (e.g., attack data) with a high RE value, and to correlate normal data patterns that are present in the training data with a low RE value.

Accordingly, it can be said that the generation and comparison of RE values may represent a means of discerning attack traffic from regular, non-attack (normal) traffic.

In an embodiment, the multi-dimensional data that is input into controllers $4a$ to $4n$ may be normalized so that each dimension has values between 0 and 1. This achieves two goals—it prevents the value of any one dimension (i.e., feature of a data point) from overly influencing a final RE value and allows the input data to be reconstructed using the inventive autoencoding functions using an activation functions such as sigmoid whose output is between 0 and 1 in the output layer of the autoencoder function.

In more detail, the inventors discovered that comparing a real-time, actual RE value against a computed RE threshold may sometimes be inaccurate because a particular, real-time RE value may be influenced by the size of the input data point (e.g. the norm of the input data point/vector x). For instance, with a linear ML model (e.g., PCA functions), for any scalar value c the RE value for input cx may be c times larger than the RE value for input x. To avoid this issue, the inventors discovered that using scaled RE values reduced the chance of errors for classification. In one embodiment, for an RE threshold T, a set of data collected during an epoch s with input x and RE value of E may be identified/classified as an attack set of data ("attack epoch") if and only if:

$$\sum_{i=1}^{n}\left(\frac{\epsilon_i}{x_i}\right)^2 \geq T$$

Figure 2B:
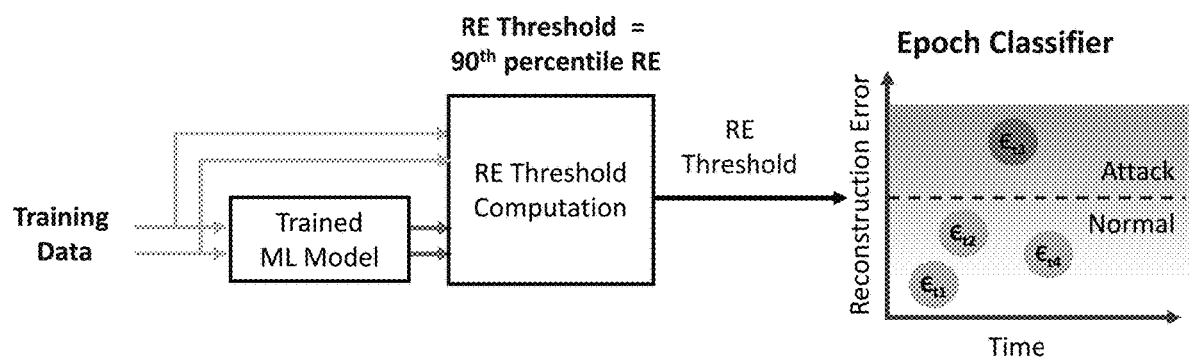

Continuing, once an RE threshold for a given set of data associated with a given end point has been determined the RE threshold for each set of data during an epoch time period may be used by controllers 4a to 4n to identify a normal set of data from an abnormal set of data—normal industrial network traffic from abnormal industrial network traffic (see FIG. 2b). In sum, in embodiments of the invention, a specific RE threshold may be associated with data received from a specific end-point 6a to 6n in the industrial network 1. Accordingly, a specific RE threshold may be used by a controller 4a to 4n to identify whether traffic from a specific end point 6a to 6n is normal or abnormal.

In embodiments of the invention the inventors discovered that a 10 second time period is a satisfactory time period for the length of an epoch. It should be noted that the inventors discovered that the length of time that corresponds to an inventive epoch should not be too short otherwise data detected and received by controller 4a to 4n during an epoch may exhibit large variations due to short term effects and because correlation between features may be lost. Further, the inventors discovered that an epoch should not be too long either because such a time period may make it harder to detect attacks that are timed to correspond with, and/or resemble normal traffic patterns during an undesirably long epoch.

In an embodiment, once a controller 4a to 4n has identified each epoch as normal or abnormal (i.e., attack) using a RE threshold, the controller may be further operable to predict or estimate whether an actual attack is occurring. The features or steps in an exemplary method for doing so are shown in FIG. 3.

In the exemplary method, a controller 4a to 4n may be operable to count the number of epochs within an adjustable, attack detection time period or "window" (hereafter abbreviated "ADTW) that have been so-identified as abnormal among all epochs within the time period, and then compute a percentage (e.g., the number of abnormal or attack epochs divided by the total number of normal and abnormal epochs). In an embodiment, the number of epochs within an exemplary ADTW may be equal to 3 epochs, though this may vary depending on the length of time of an epoch, for example. If the computed percentage exceeds threshold (e.g., 50%, where the number of abnormal or attack epochs equals half or more of the total number of normal and abnormal epochs) then a controller 4a to 4n may be operable to classify the ADTW and the data within a particular ADTW as attack data.

Figure 3:
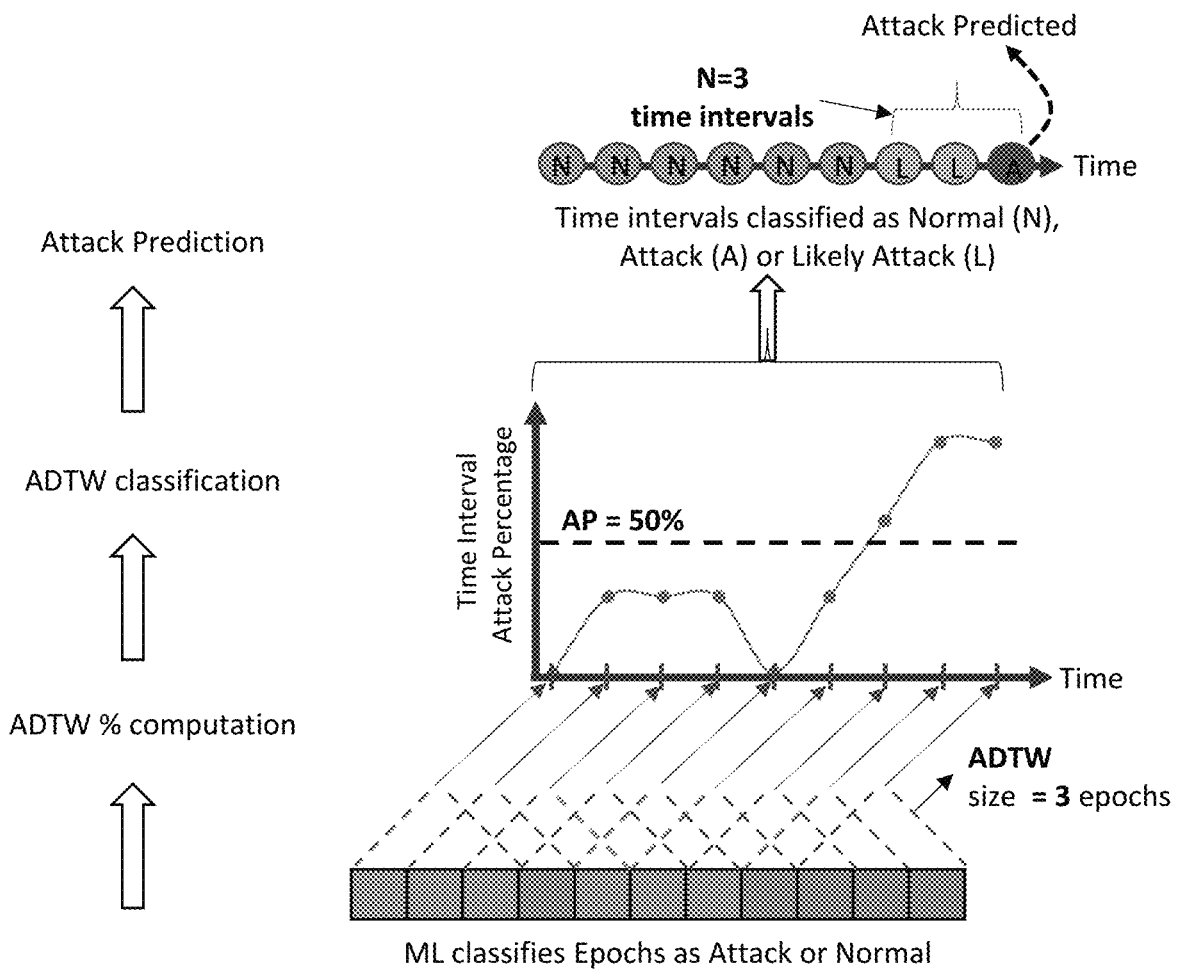
FIG. 3 depicts an exemplary illustration of inventive aggregated time periods to detect abnormal, attack traffic patterns according to embodiments of the invention.

In an alternative embodiment, when an ADTW that has been classified as an attack follows an ADTW classified as normal this indicates that an attack may likely occur (shown with the symbol L in FIG. 3). However, in an embodiment, to avoid false positives (i.e., falsely classifying normal behaviour as an attack), an attack may only be declared if multiple consecutive ADTWs are classified as attack ADTWs. Further, in an embodiment, the greater the number of consecutive ADTWs that are classified as attack ADTWs then the greater the intensity of the attack.

Still further, as mentioned previously, in an embodiment, if a sequence of N number of ADTWs are classified as attacks then this may indicate that the chances that an attack is occurring is very high. Accordingly, in an embodiment, the controllers 4a to 4n may be operable to implement additional processes (by executing additional instructions stored in memory) to suppress the attack. In FIG. 3, N is 3 time windows and, therefore, the third of the 3 consecutive aggregated time periods (ADTWs) is labelled with the symbol A indicating that an attack is now been determined as definite. In embodiments of the invention, an attack alert may be generated by, for example, controllers 4a to 4n. In an embodiment, if the number of epochs within an aggregated time period is 100, an epoch attack percentage (AP) threshold may be 50% (where the number of abnormal or attack epochs equals half or more of the total number of normal and abnormal epochs) AP=50% and N=10 time windows which may translate to approximately 2 minutes in one embodiment to begin suppressing an attack after the time that it is first detected. This is because time windows are computed at the end of each epoch.

While existing techniques may be effective at detecting DDoS attacks that are already underway, the inventive RE threshold techniques described herein are believed to be more successful at detecting DDOS attacks earlier than previously thought possible. This ability allows the systems, devices and related methods provided by the present invention to detect malicious attacks as soon as possible—well before any disruption in an industrial network. In an embodiment, the inventive RE threshold techniques described herein may be continuously executed by controllers 4a to 4n. That is, data from an industrial network may be continuously received and analyzed to determine if a percentage of epochs over a pre-determined, real-time or adjustable time period are identified as being normal or abnormal based on whether an RE threshold for each epoch has been exceeded. Further, in yet another embodiment, an attack "intensity" may be measured by computing a percentage of epochs that are identified as being abnormal within a pre-determined, real-time or adjustable time period to help determine the need to urgently respond to thwart such an attack.

As discussed further herein, to test whether the use of their inventive unsupervised, machine learning functions that use the inventive RE thresholds provide a meaningful method of detecting normal or abnormal traffic, the inventors constructed supervised classifiers based on an existing, support vector machine (SVM) technique and compared the ability of the SVM technique to detect normal and abnormal traffic patterns with the ability of the inventive RE thresholds based technique to detect normal and abnormal traffic patterns for two, very different types of DDoS attacks. The inventors discovered that the inventive RE threshold techniques were able to identify new, unknown attacks (abnormal traffic) while the SVM technique was unable to do so because the latter approach had not been trained to identify unknown, abnormal traffic patterns.

Once an attack (e.g., a DDoS attack, such as a SYN attack) is detected, it must be stopped. Existing techniques attempt to block the abnormal traffic using software defined networking (SDN). For example, existing techniques analyze packet headers in the traffic aimed at a target to identify the source of an attack. Another existing technique attempts to detect an attack on an end point-by-end point basis. However, the inventors discovered that neither technique reliably detects the source of an attack because, for example, the identity of the source of an attack may be concealed (using IP spoofing) or because, in a DDoS attack, each compromised source may not individually generate a significant amount of attack traffic.

Recognizing the shortcomings of existing techniques, the inventors discovered techniques that overcome attempts to thwart or conceal a source of an attack by, for example, providing a controller (e.g., $4a$ to $4n$) that is operable to compare network traffic patterns sent by each one of a plurality of suspect sources during an attack to abnormal network traffic patterns received by a target of the attack. In an embodiment, if the type of traffic pattern received from a source during an attack is substantially the same as the abnormal traffic pattern received by a target of the attack then a source (or sources) may be a suspect source of the attack. More particularly, in one embodiment if the traffic pattern from a source during an attack exceeds an RE threshold associated with a given traffic pattern associated with a target then the source (or sources) may be a suspected source of the attack.

In more detail, similar autoencoding and PCA functions that have been used to identify abnormal or normal traffic at the target of an attack may be further used to detect the traffic patterns from each potential source of an attack. An exemplary method for so detecting the source of attack traffic is illustrated in FIG. 4.

Figure 4:
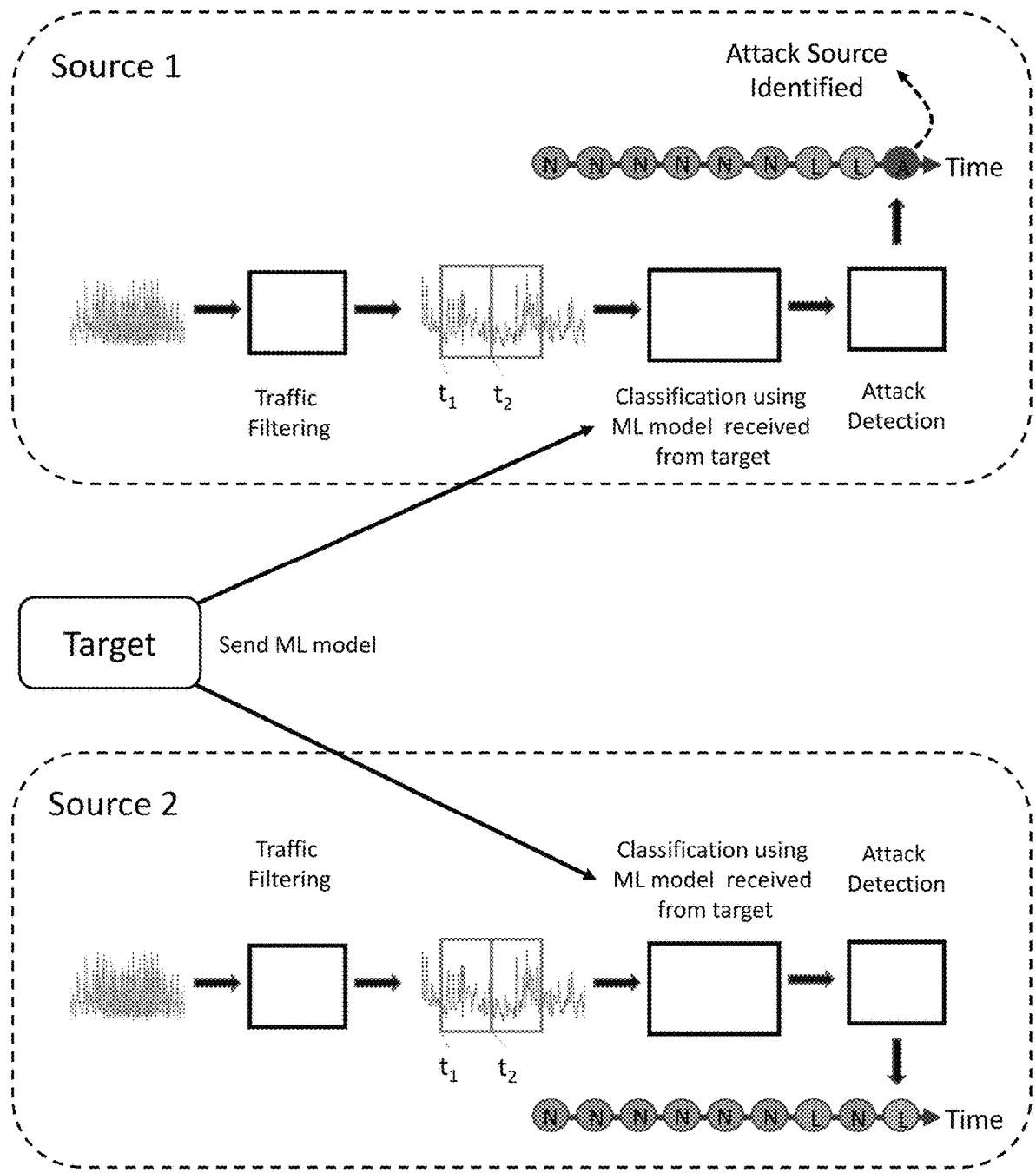
FIG. 4 depicts an exemplary illustration of an inventive response to identify the source of a malicious, attack traffic pattern according to embodiments of the invention.

In the exemplary method illustrated in FIG. 4, an inventive controller (not shown in FIG. 4, e.g., $4a$ to $4n$) may be operable to execute autoencoding and PCA functions similar to those describe above based on traffic received from a particular source (e.g., end point $6a$, $6b$), instead of from a collection means associated with a target of the attack within network 1. In an embodiment, traffic from all end points $6a$ to $6n$ in FIG. 1 (potential sources of an attack) may be analysed by an inventive controller using the inventive autoencoding and PCA functions, for example.

Prior to analysing traffic from a potential source of an attack, an inventive controller may be operable to filter out (electronically remove or delete) all traffic that originates from a particular source that is not directed at the target. This results in exposing just the traffic from the source to the target. Thereafter, in an embodiment, an inventive controller may be operable to generate a RE value based on traffic received from each source during a suspected attack and compare the RE value to an already computed RE threshold associated with the target based on non-attack traffic patterns. If the RE value exceeds the RE threshold then the source is most likely at least one source of the attack.

It should be understood that the inventive comparison function just described makes use of the fact that the traffic pattern of an attack sent from a source of an attack to a target is, most likely, similar to the abnormal traffic pattern received by the target and detected by the inventive controller during a potential attack.

Once the one or more sources of an attack are identified, traffic (data) from such sources may be further analyzed to determine whether to add the traffic pattern or certain types of packets and flows from such a source to a "whitelist" or "blacklist". For example, during a SYN attack with random IP spoofing only those packets destined for a target under attack having a source IP address from a known list of IP addresses assigned to the source that are known to be valid (non-malicious) may be "whitelisted". Thereafter, malicious, attack traffic may be blocked at or close to the source by applying packet filters, access control rules on switches, routers, gateways and servers with standard network and host-based techniques such as SDN, iptables, etc.

In addition to providing inventive techniques for identifying malicious attacks and their sources, the inventors also provide inventive techniques for updating the inventive autoencoding and PCA functions to help minimize the identification of false positives, for example.

Figure 5:
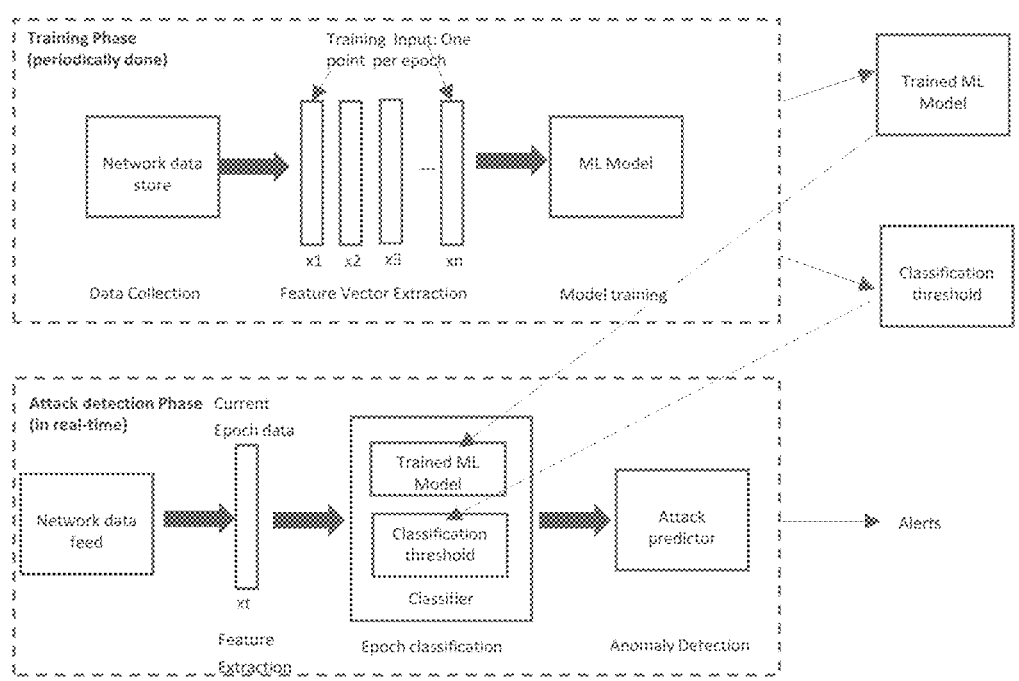
FIG. 5 depicts a simplified block diagram of a method for continuously adapting a Machine Language epoch classifier to reduce or eliminate the detection of false positives (i.e., false attacks) according to an embodiment of the invention.

False positives may occur due to both short term perturbations and long term (e.g. seasonal) temporal variations in the normal operation of elements of a network, like network 1. Recognizing this, the inventors discovered the false positives could be reduced or minimized by continuously adapting the inventive autoencoding and PCA functions, as illustrated in FIG. 5. In an embodiment, these functions may be updated by continuously analysing current and historical network traffic data and data patterns. More particularly, each of the autoencoding and PCA functions stored within one or more controllers $4a$ to $4n$ (e.g., the stored executable instructions and data) may be periodically adjusted (where period may be a few days to weeks depending on the rate of false positives).

In an embodiment, an exemplary adjustment method may comprise inputting random samples of (normal) sets of network data from different elements of the network and from recent time periods versus older time periods (i.e., the number of sets of data, used to adjust the autoencoding and PCA functions, from older time periods decreases exponentially). That is if $T_0$, $T_1$, $T_2$, . . . are time periods ordered by age with $T_0$ being the current time period, then the number of sets of data (i.e., epochs) selected for time period $T_i$ is given by $d_0/s^i$ where a number of do sets of data may be selected from time period $T_0$ and s may represent a decay rate. The parameters s and do allow the flexibility to both limit the total amount of data used for adjusting the autoencoding and PCA functions as well as controlling the mix of new and old data used to continually adjust the autoencoding and PCA functions.

Testing Methodology and Results

Due to a lack of publicly available IoT datasets, the inventors used a combination of a small industrial profinet network and a virtual network created using mininet and Linux network namespaces as a representative, experimental network to test their inventive methodologies/controllers.

The industrial profinet network consisted of synchronized real time traffic from industrial robot, sensors, and controllers and was comprised mainly of small packets and some non-real time unsynchronized control traffic with variable packet sizes. The virtual network consisted of 100+ hosts (e.g., end points) generating traffic using iperf and hping utilities which was captured using ovs mirroring at intermediate switches. Several experiments were conducted by varying the number of end points and the number, duration and size of traffic flows to create a good representation of real IoT, video and other types of network traffic. The combination of packets from the virtual and industrial network comprised a normal data traffic set.

To generate SYN flood attack traffic, a subset of virtual mininet hosts (emulating IoT devices) with up to 10 interfaces were used to launch attacks on a target using IP spoofing, similar to the Metasploit SYN flood. To overcome the high resource consumption of Metasploit imposed by Ruby implementation, the inventors implemented a similar attack engine in C++ with additional features that allow packet transmission on multiple interfaces and provide the ability to spoof more than one IP address for each source (e.g., end point) This C++ implementation resulted in a 90-fold increase over the Metasploit engine for peak packet transmission, nearly 525K packets/sec, that resulted in resource saturation on the target with 33% packet loss. Additional TCP SYN attack traffic was generated using hping and network namespaces. Multiple attack traffic datasets were generated of varying duration and intensities. Slow HTTP attack traffic was also simulated using similar techniques. Both normal and attack traffic was collected in sets of data (epochs) as described herein. The epochs were then further processed as described herein.

Experimental Methodology and Results

The inventors experimentally addressed (a) the effectiveness of the inventive, unsupervised, autoencoding and PCA functions for detecting an attack on an industrial network, (b) the effectiveness of their unsupervised ML approach for new and unknown attack detection compared to existing, supervised techniques such as SVM, and (c) the effectiveness of their ML based approach for detecting sources of attacks. The inventors used detection accuracy and latency as metrics.

Methodology: For evaluation purposes the inventors used three different types of data sets. "Type A" data set consisted entirely of normal epochs that was used for training (adjusting) the autoencoding and PCA functions. "Type B" data set included both normal and attack epochs and was used for both training an existing older SVM classifier as well as for testing the inventive unsupervised, RE threshold autoencoding and PCA functions. The Type B data set was captured during a time period when the network was undergoing a SYN attack for some portion of an observation period. A "Type C" data set was similar to the Type B data set except that it represents a slow HTTP DDoS attack. It was used for testing both the inventive unsupervised, RE threshold autoencoding and PCA functions and existing SVM classifier with an attack they had not been trained on. The Type B data sets consisted of approximately 40% normal and 60% attack epochs while type C data sets consisted of approximately 30% normal and 70% attack epochs. The inventors collected data from all the hosts (e.g., end points) to build individual ML models for them, and then used the models for attack detection for three specific hosts which were known to be under attack and two hosts which were not known to be under attack. The inventors applied their inventive source detection methodologies to ten potential attack sources, some of which were involved in DDoS attacks, by identifying/classifying data collected at those end points using the unsupervised, RE threshold ML models of the target hosts.

The inventors implemented their inventive unsupervised, RE threshold autoencoding and PCA ML models using python sklearn library and using tensorflow in keras. The inventors normalized all data to have values in the range 0-1. The inventors discovered that deep (i.e., many layers) autoencoding with five layers (e.g., one input, one output and three hidden layers) with a middle layer being a code layer that worked well for attack identification/classification. The inventors used the rectified linear unit (ReLU) activation function for all layers except the output layer for which the inventors tried both ReLU and Sigmoid activation functions. The inventors discovered that each performed equally well. The inventors trained the inventive autoencoding function on a batch size of 32 (e.g., a standard parameter for a stochastic gradient descent process for training neural networks) for 50 epochs and optimized the Mean Square Error loss using an Adam optimizer. The inventors did not include any regularizer terms in the loss function. The learning rate and weight decay were both set to the default values from the keras library. The input and output layer both had dimension 7 of our feature set. The inventors performed a few experiments to select the size of the other layers based on the rate of convergence of the loss function. The inventors discovered that 14 and 4 are the best dimensions for hidden and middle (code) layers, respectively. For the inventive PCA function, the inventors used a built-in model from the sklearn library with all default settings. For SVM the inventors used a Polynomial kernel because the inventors discovered that it performed the best compared to other (e.g. Linear, RBF) kernels.

Attack detection: Below, the inventors provide Precision, Recall and F1-scores to measure how well the different classifiers performed. Each experiment was repeated 10 times and averages were computed. As can be seen from Table I below, even though both the inventive, unsupervised autoencoding and PCA functions were trained on the Type A data set (which included only normal traffic) each performed quite well on the Type B data set (which also included attack traffic on which they were not trained on).

TABLE I

UNSUPERVISED CLASSIFIERS, TYPE B DATA SET

| Method | Data Type | Precision | Recall | F1 Score |
|---|---|---|---|---|
| Autoencoder | Normal | 0.996 | 0.999 | 0.997 |
| PCA | Normal | 0.996 | 0.999 | 0.9997 |
| Autoencoder | Attack | 0.999 | 0.997 | 0.998 |
| PCA | Attack | 0.999 | 0.997 | 0.998 |

As can be seen from Table II the existing, supervised classifier based on Linear SVMs also performed quite well on the Type B data set on which it was trained (i.e., with known attack data patterns).

TABLE II

SUPERVISED CLASSIFIER (SVM), TYPE B DATA SET

| Method | Data Type | Precision | Recall | F1 Score |
|---|---|---|---|---|
| SVM | Normal | 0.997 | 0.999 | 0.998 |
| SVM | Attack | 0.999 | 0.997 | 0.998 |

However, as can be seen from Table III while the unsupervised classifiers based on Autoencoder and PCA continue to perform well on Type C data set there is a significant drop off in performance for the existing, supervised classifier based on SVMs. This shows conclusively that the latter are not effective for new and unseen attacks.

TABLE III

ALL CLASSIFIERS, NEW ATTACK, TYPE C DATA SET

| Method | Data Type | Precision | Recall | F1 Score |
|---|---|---|---|---|
| Autoencoder | Normal | 0.889 | 0.987 | 0.935 |
| PCA | Normal | 0.915 | 0.945 | 0.930 |
| SVM | Normal | 0.370 | 0.998 | 0.539 |
| Autoencoder | Attack | 0.994 | 0.941 | 0.967 |
| PCA | Attack | 0.974 | 0.958 | 0.966 |
| SVM | Attack | 0.995 | 0.187 | 0.315 |

TABLE III-continued

ALL CLASSIFIERS, NEW ATTACK, TYPE C DATA SET

| Method | Data Type | Precision | Recall | F1 Score |
| --- | --- | --- | --- | --- |

Next, the inventors provide experimental results on the effectiveness of the inventive autoencoding and PCA functions by measuring how quickly each can identify incipient attacks as well as how quickly each triggers a mitigative response (Table IV below).

TABLE IV

LATENCY OF ATTACK DETECTION AND MITIGATION, TYPE B AND TYPE C DATA SET

| Method | Data Set Type | Delay1 (secs.) | Delay2 (secs.) |
| --- | --- | --- | --- |
| Autoencoder | B | 2 | 2 |
| PCA | B | 2 | 3 |
| SVM | B | 2 | 2 |
| Autoencoder | C | 22 | 29 |
| PCA | C | 17 | 19 |
| SVM | C | ∞ | ∞ |

To do so, the inventors: (1) set a current ADTW to 100 epochs (were each epoch was 10 secs.); (2) set the attack percentage or AP threshold to 50%; and (3) set the attack duration or AD interval to 10 epochs (or about 2 mins.). The inventors used both Type B and Type C data sets of 1500 epochs comprising 30% normal epochs followed by 70% attack epochs. The inventors discovered that the percentage of attack epochs in the data sets increased over time and eventually reached 100%. Thus, the inventors expected that such an attack would invoke a mitigative response well before the time it took for an attack to build up. As set forth in Table IV, the inventors discovered: the average delay in seconds (Delay 1) at which the inventive and existing SVM classifiers predicted an attack measured from the time when the number of attack epochs in an ADTW exceeded 50 (50% of 100); and the average delay (Delay 2) in seconds at which mitigation was invoked compared to a "best possible" (e.g., exactly 10 epochs after detection). As can be seen in Table IV, on all types of data sets the unsupervised, inventive classifiers quickly (with very low delay) identified the start of an attack as well as invoked a mitigative response. However, while the existing supervised SVM classifier performed equally well on known attacks (Type B data set), it failed to detect new attacks (Type C data set). This is because, on average, the existing classifier only classifies at most 20% of epochs as attack epochs. Thus, it never crossed the attack percentage (AP) threshold of 50%.

The inventors' experiments showed that the inventive, network-based techniques for training unsupervised classifiers (e.g., controllers operable to execute instructions for completing autoencoding and PCA functions) that used only normal traffic data were more effective in detecting both known and unknown attacks aimed at industrial networks than existing classifiers.

It should be understood that the foregoing description only describes a few of the many possible embodiments that fall within the scope of the inventions. Numerous changes and modifications to the embodiments disclosed herein may be made without departing from the general spirit of the invention, the scope of which is best defined by the claims that follow.

We claim:

1. An unsupervised method for the continuous, real-time detection of abnormal traffic in an industrial network comprising: collecting data from endpoints of the industrial network; grouping the collected data into sets of data, each set representing data that is grouped into a set during an adjustable time period before the time period expires; aggregating and mapping the data that is within each set to a single multi-dimensional point value;

normalizing each of the multi-dimensional point values whereby no individual feature of the collected data dominates any other feature of the collected data; extracting data features from each multi-dimensional point value by executing a machine learning process that computes a lower dimensional representation of the collected data; identifying each set of extracted data in real-time as normal or abnormal once the data has been grouped into groups of data by determining whether a scaled, real-time reconstruction error (RE) value is below or above a RE threshold value, the RE threshold value based on a previously computed error between what is output by the machine learning process for a given input based on data previously collected during normal operation of the industrial network; determining the number of sets of data within an adjustable, attack detection time period (hereafter "window") that have been so-identified as abnormal among all time periods within the window; computing a percentage based on the number of identified abnormal sets of data within the window divided by the total number of normal and abnormal sets of data within the window, and declaring the data, within the abnormal sets within the window, attack data when the computed percentage is greater than a threshold percentage, wherein declaring an attack when a plurality of consecutive adjustable time periods are classified attack time periods and wherein collecting the data from collection means configured and connected close to an end point of the network.

2. The method as in claim 1 wherein the threshold percentage is 50%.

3. The method in claim 1 wherein the RE threshold is computed as a value for which 90% of the data within a previous training set of data has lower real-time RE value and the remaining data in the training set has higher RE values.

4. The method as in claim 1 wherein the adjustable time period is ten seconds.

5. The method as in claim 1 further comprising collecting the data from collection means configured and connected close to an end point of the network.

6. The method as in claim 1 further comprising collecting the data by executing packet capture process or virtual machine/container.

7. The method as in claim 6 wherein the virtual machine/container comprises tcpdump.

8. An unsupervised method for detecting the source of an attack in an industrial network comprising: collecting data from one or more endpoints of the industrial network that are suspected of being sources of an attack; normalizing the collected data whereby no individual feature of the collected data dominates any other feature of the collected data: electronically filter out data that originates from sources that are not directed at a target;

generating a scaled, RE value based on data from sources that are directing data at the target during the attack; comparing the generated, scaled RE value to a previously computed RE threshold associated with the target based on non-attack traffic patterns; declaring one or more of the sources to be a source of the attack when the generated RE value exceeds the RE threshold, wherein declaring an attack when a plurality of consecutive adjustable time periods are classified attack time periods and wherein collecting the data from collection means configured and connected close to an end point of the network.

9. The method as in claim 1 where Machine Learning model training is repeated periodically and computing the RE threshold is repeated periodically using data collected since the last time the training was performed.

10. A hardware controller operable to control an unsupervised, continuous, real-time detection of abnormal traffic in an industrial network by: collecting data from endpoints of the industrial network; grouping the collected data into sets of data, each set representing data that is grouped into a set during an adjustable time period before the time period expires; aggregating and mapping the data that is within each set to a single multi-dimensional point value; normalizing each of the multi-dimensional point values so no individual feature of the collected data dominates any other feature of the collected data; extracting data features from each multi-dimensional point value by executing a machine learning process that computes a lower dimensional representation of the collected data;

identifying each set of extracted data in real-time as normal or abnormal once the data has been grouped into groups of data by determining whether a scaled, real-time reconstruction error (RE) value is below or above a RE threshold value, the RE threshold value based on a previously computed error between what is output by the machine learning process for a given input based on data previously collected during normal operation of the industrial network; determining the number of sets of data within an adjustable, attack detection time period (hereafter "window") that have been so-identified as abnormal among all time periods within the window; computing a percentage based on the number of identified abnormal sets of data within the window divided by the total number of normal and abnormal sets of data within the window, and declaring the data, within the abnormal sets within the window, attack data when the computed percentage is greater than a threshold percentage, wherein declare an attack when a plurality of consecutive adjustable time periods are classified attack time periods and wherein collect the data from collection means configured and connected close to an end point of the network.

11. The hardware controller as in claim 10 wherein the threshold percentage is 50%.

12. The hardware controller as in claim 10 wherein the RE threshold is computed as a value for which 90% of the data within a previous training set of data has lower real-time RE value and the remaining data in the training set has higher RE values.

13. The hardware controller as in claim 10 wherein the machine learning process comprises an autoencoding process or principle component analysis process.

14. The hardware controller as in claim 10 further operable to collect the data by executing packet capture process or virtual machine/container.

15. The hardware controller as in claim 14 wherein the virtual machine/container comprises tcpdump.

16. The hardware controller as in claim 10 further operable to detect the source of an attack in an industrial network by: collecting data from one or more endpoints of the industrial network that are suspected of being sources of an attack; electronically filter out data that originates from sources that are not directed at a target; generating a scaled, RE value based on data from sources that are directing data at the target during the attack; comparing the generated, scaled RE value to a previously computed RE threshold associated with the target based on non-attack traffic patterns; declaring one or more of the sources to be a source of the attack when the generated, scaled RE value exceeds the RE threshold.

17. The hardware controller as in claim 16 where the controller is operable to repeatedly and periodically complete a Machine Learning model training and where computing the RE threshold is repeated periodically using data collected since the last time the training was performed.

* * * * *